(12) United States Patent
Lau

(10) Patent No.: US 8,226,453 B2
(45) Date of Patent: Jul. 24, 2012

(54) SHOULDER STRAP AND METHOD FOR MANUFACTURING THE SAME

(75) Inventor: Wai Ching Andy Lau, Hong Kong (HK)

(73) Assignee: Clover Group International Limited, Kowloon (HK)

( * ) Notice: Subject to any disclaimer, the term of this patent is extended or adjusted under 35 U.S.C. 154(b) by 196 days.

(21) Appl. No.: 11/839,273

(22) Filed: Aug. 15, 2007

(65) Prior Publication Data

US 2008/0060745 A1  Mar. 13, 2008

Related U.S. Application Data

(60) Provisional application No. 60/824,777, filed on Sep. 7, 2006.

(51) Int. Cl.
*A41C 3/00* (2006.01)

(52) U.S. Cl. ............... 450/86; 2/338

(58) Field of Classification Search ............ 450/86, 450/88; 2/310–312, 336, 338, 326, 327
See application file for complete search history.

(56) References Cited

U.S. PATENT DOCUMENTS

| | | | | |
|---|---|---|---|---|
| 3,025,859 A | * | 3/1962 | Rosenberg | 450/86 |
| 3,295,529 A | * | 1/1967 | Corrigall et al. | 450/86 |
| 3,616,148 A | * | 10/1971 | Edelman | 428/129 |
| 3,653,075 A | * | 4/1972 | Gluckin et al. | 2/338 |
| 3,873,403 A | * | 3/1975 | Edelman | 428/111 |
| 3,897,776 A | * | 8/1975 | Gaylord, Jr. | 602/19 |
| 3,964,653 A | * | 6/1976 | Strutz | 224/257 |
| 6,572,437 B1 | * | 6/2003 | Waitz | 450/1 |
| 6,634,923 B2 | * | 10/2003 | Waitz | 450/86 |
| 7,147,538 B2 | * | 12/2006 | Cano | 450/86 |
| 2004/0259469 A1 | | 12/2004 | Cano | |
| 2005/0097658 A1 | | 5/2005 | Lyons et al. | |

FOREIGN PATENT DOCUMENTS

| | | |
|---|---|---|
| DE | 20204796 U1 | 9/2003 |
| EP | 1024713 B1 | 10/2003 |

OTHER PUBLICATIONS

International Search Report dated Dec. 13, 2007 for PCT Application No. PCT/CN2007/002588.

* cited by examiner

*Primary Examiner* — Gloria Hale

(74) *Attorney, Agent, or Firm* — Muncy, Geissler, Olds & Lowe, PLLC

(57) ABSTRACT

A shoulder strap includes a first stretch fabric and a second stretch fabric, and a first rigid fabric sandwiched between the first stretch fabric and a second stretch fabric and adhered to the first stretch fabric. The rigid fabric is located at an intermediate position between opposite ends of the first stretch fabric and the second stretch fabric.

12 Claims, 5 Drawing Sheets

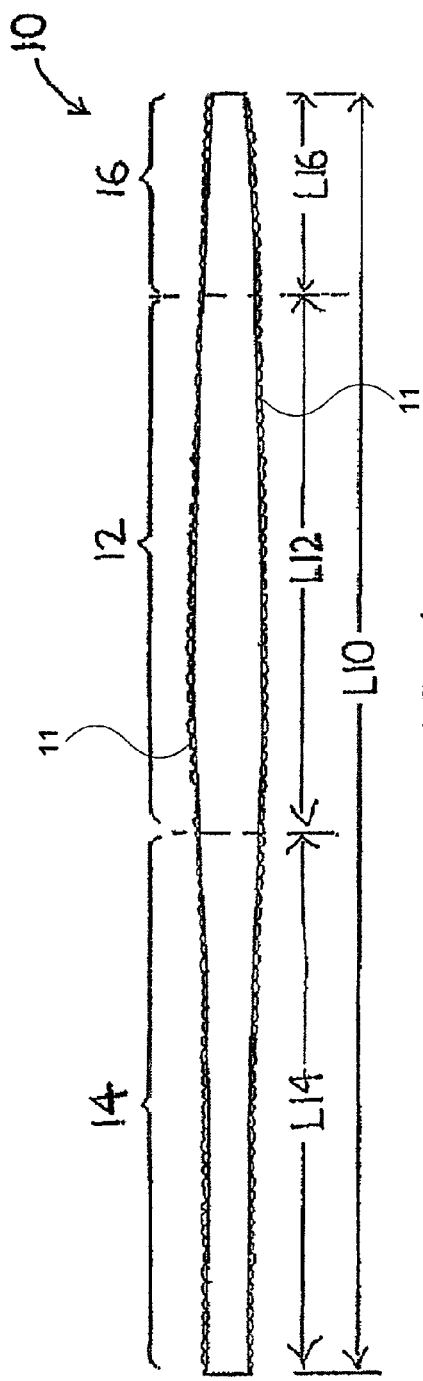
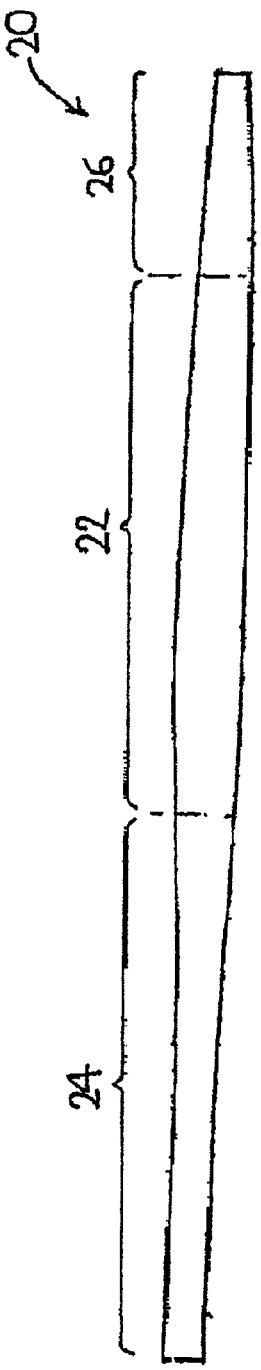

SHOULDER STRAP AND METHOD FOR MANUFACTURING THE SAME

CROSS REFERENCE TO RELATED APPLICATION

Pursuant to 35 U.S.C. 119(e), this application claims priority to U.S. Provisional Application No. 60/824,777, filed Sep. 7, 2006, the contents of which are hereby incorporated herein by reference.

BACKGROUND

Shoulder straps for articles of clothing such as brassieres are often made of either non-stretchable fabric or stretchable fabric. Shoulder straps made entirely of non-stretchable fabric are uncomfortable and non-flexible to a user. On the other hand, shoulder straps made entirely of stretchable fabric may not provide the necessary support and desired stiffness to the user.

Shoulder straps for articles of clothing such as brassieres are usually in the form of elongated narrow straps having the same width along the entire length of the shoulder strap. These narrow shoulder straps may deform and twist easily, especially when they are made of thin elastic fabric. If a middle shoulder-engaging portion of the shoulder strap becomes deformed and twisted, it may cause discomfort and distress to the wearer, and can be unsightly in appearance.

Consequently, there is a need to provide an improved shoulder strap for articles of clothing such as brassieres. It is also desirable to manufacture shoulder straps that are comfortable and have minimal seam allowances to be aesthetically desirable.

SUMMARY

According to one aspect, a method for manufacturing a shoulder strap includes the steps of adhering a first adhesive film to a first stretch fabric to form a first adhesive stretch fabric, adhering a second adhesive film to a second stretch fabric to form a second adhesive stretch fabric, sandwiching a first rigid fabric between the first and second adhesive stretch fabrics, and fusing the first rigid fabric and the first and second adhesive stretch fabrics to form a strap.

According to another aspect, a method for manufacturing a shoulder strap includes the steps of adhering a first adhesive film to a first stretch fabric to form an adhesive stretch fabric, sandwiching a first rigid fabric and a second rigid fabric between the adhesive stretch fabric and a second adhesive film, fusing the first rigid fabric onto the first stretch fabric and the second rigid fabric onto the second adhesive film to form a fabric assembly, and ultrasonically cutting the fabric assembly along the longitudinal edges to form a strap.

According to a further aspect, a shoulder strap includes a first stretch fabric and a second stretch fabric, and a first rigid fabric sandwiched between the first stretch fabric and a second stretch fabric and adhered to the first stretch fabric. The rigid fabric is located at an intermediate position between opposite ends of the first stretch fabric and the second stretch fabric.

BRIEF DESCRIPTION OF THE DRAWINGS

FIG. 1 depicts a plan view of one side of an ultrasonic scallop-cut shoulder strap.

FIG. 2 depicts a plan view of one side of an ultrasonic-cut and bag-out shoulder strap.

DETAILED DESCRIPTION

Figure 3A:
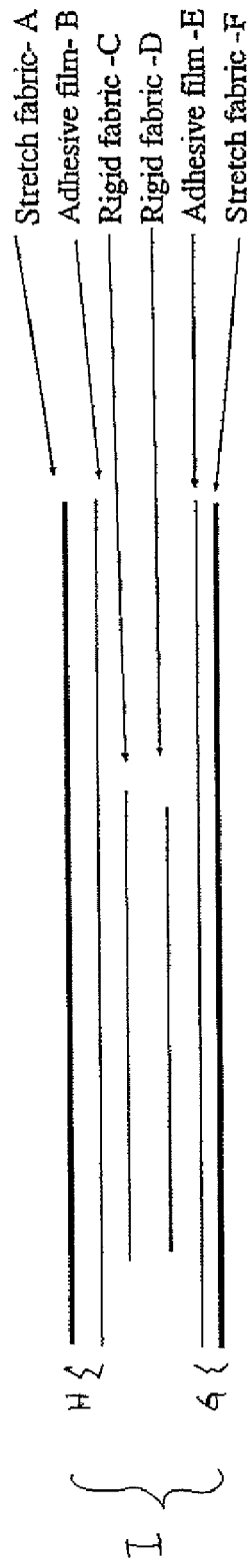
FIG. 3A depicts the layer structure of the shoulder straps of FIGS. 1 and 2.

Reference will now be made in detail to a particular embodiment of the invention, examples of which are also provided in the following description. Exemplary embodiments of the invention are described in detail, although it will be apparent to those skilled in the relevant art that some features that are not particularly important to an understanding of the invention may not be shown for the sake of clarity.

Furthermore, it should be understood that the invention is not limited to the precise embodiments described below and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims. In addition, improvements and modifications which may become apparent to persons of ordinary skill in the art after reading this disclosure, the drawings, and the appended claims are deemed within the spirit and scope of the present invention.

Where used in the various figures of the drawings, the same numerals designate the same or similar parts. Furthermore, when the terms "top", "bottom", "first", "second", "front", "back", "outer", "inner", "upper", "lower", "length", "width", "end", "side", and similar terms are used herein, it should be understood that these terms have reference only to the structure shown in the drawings as it would appear to a person viewing the drawings and are utilized only to facilitate describing the invention.

A shoulder strap 10 may include a relatively widened rigid intermediate portion 12 and two relatively narrowed stretchable end portions 14 and 16, as depicted in FIG. 1. The shoulder strap 10 or 20 may include two outer stretch fabrics A and F as well as two inner rigid fabrics C and D, as depicted in FIG. 3A. The two inner rigid fabrics C and D may be shorter than the two outer stretch fabrics A and F, and may be sandwiched between A and F. Two fusible adhesive films B and E may be fused onto the stretch fabrics A and F and rigid fabrics C and D, thereby adhering the stretch fabrics A and F and rigid fabrics C and D together to form the shoulder strap 10 or 20.

A plan view of one side of a shoulder strap 10 is depicted in FIG. 1. The shoulder strap 10 has an intermediate portion 12 and two opposite end portions 14 and 16. In use, the intermediate portion 12 extends over the shoulder of the user, whereas the two end portions 14 and 16 extend over the chest and the back of the user, respectively. For example, the intermediate portion 12 may be rigid and the two end portions 14 and 16 may be stretchable. The intermediate portion 12 defines a shoulder-engaging portion for engagement with the shoulder of the user when an article of clothing is being worn. The two opposite end portions 14 and 16 define two supporting portions for supporting the article of clothing being worn by the user.

For example, the article of clothing may be a brassiere. A brassiere may include shoulder strap 10 or 20 attached to a brassiere body. It is understood that articles of clothing of different designs and sizes may also utilize shoulder straps of different shapes, lengths and widths. It is also appreciated that the shoulder strap 10 may be employed to support other articles, such as a handbag, over the shoulder of a user. A handbag may include shoulder strap 10 or 20 attached to a handbag body.

The shoulder strap has a length L10, and the intermediate portion 12 has a length L12, which is sufficiently long enough to extend over the entire shoulder of the user. The end portion 14 has a length L14, which is longer than the length L16 of the end portion 16, although it is understood that the two end portions 14 and 16 may have the same length. For example, the length L10 may be about 555 to 585 mm, the length L12 may be about 190 to 200 mm, the length L14 may be about 310 to 320 mm, and the length L16 may be about 55 to 65 mm.

The intermediate portion 12 of the shoulder strap 10 may be relatively widened, and the end portions 14 and 16 may be relatively narrowed. For example, the relatively widened intermediate portion 12 may have a width of about 25 to 28 mm, and the relatively narrowed end portions 14 and 16 may have a width of about 20 to 23 mm.

For visual appearance, scallop cuts 11 may be formed along the two longitudinal edges of the shoulder strap 10. As used herein, the term "scallop cut" means a cutting formed along an edge of a fabric into a wavy scallop shape by means of a "scallop" blade of a cutting machine.

In another embodiment, the shoulder strap 20 may have a relatively widened intermediate portion 22 and relatively narrowed end portions 24 and 26, as depicted in FIG. 2. The shoulder strap 20 may be similar to the shoulder strap 10 of FIG. 1 in shape and size, except that it is manufactured in accordance with a different method, which will be described later in detail, and that it does not have scallop cuts.

The shoulder strap 10 or 20 may be made of fabric layers of different materials and different lengths. The layer structure of shoulder strap 10 or 20 is depicted in FIG. 3A. The shoulder strap 10 or 20 may include two outer stretch fabrics A and F as well as two inner rigid fabrics C and D. As used herein, the term "stretch fabric" means fabrics that may at least be stretchable in certain directions, and the term "rigid fabric" means fabrics that may not be stretchable in any directions. Stretch fabrics and rigid fabrics independently may be synthetic fabrics.

The length of the outer stretch fabric A may be substantially the same as the length of the outer stretch fabric F, and the length of the inner rigid fabric C may be substantially the same as the length of the inner rigid fabric D, while the lengths of the two inner rigid fabrics C and D may be shorter than the lengths of the two outer stretch fabrics A and F. The outer stretch fabrics A and F may be made of nylon spandex or any other suitable material known to one skilled in the art, and the inner rigid fabrics C and D may be made of nylon or any other suitable material known to one skilled in the art.

Fusible adhesive film B may be adapted to be fused onto and adhere to stretch fabric A and rigid fabric C, and fusible adhesive film E may be adapted to be fused onto and adhere to stretch fabric F and rigid fabric D. The adhesive films B and E may be made of polyurethane or any other suitable material known to one skilled in the art. Together, stretch fabrics A and F as well as rigid fabrics C and D may form the shoulder strap 10 or 20. Although it has been shown and described that there are two inner rigid fabrics C and D, it is understood by a person skilled in the art that the shoulder strap 10 or 20 may have only a single inner rigid fabric.

Figures 4, 5:
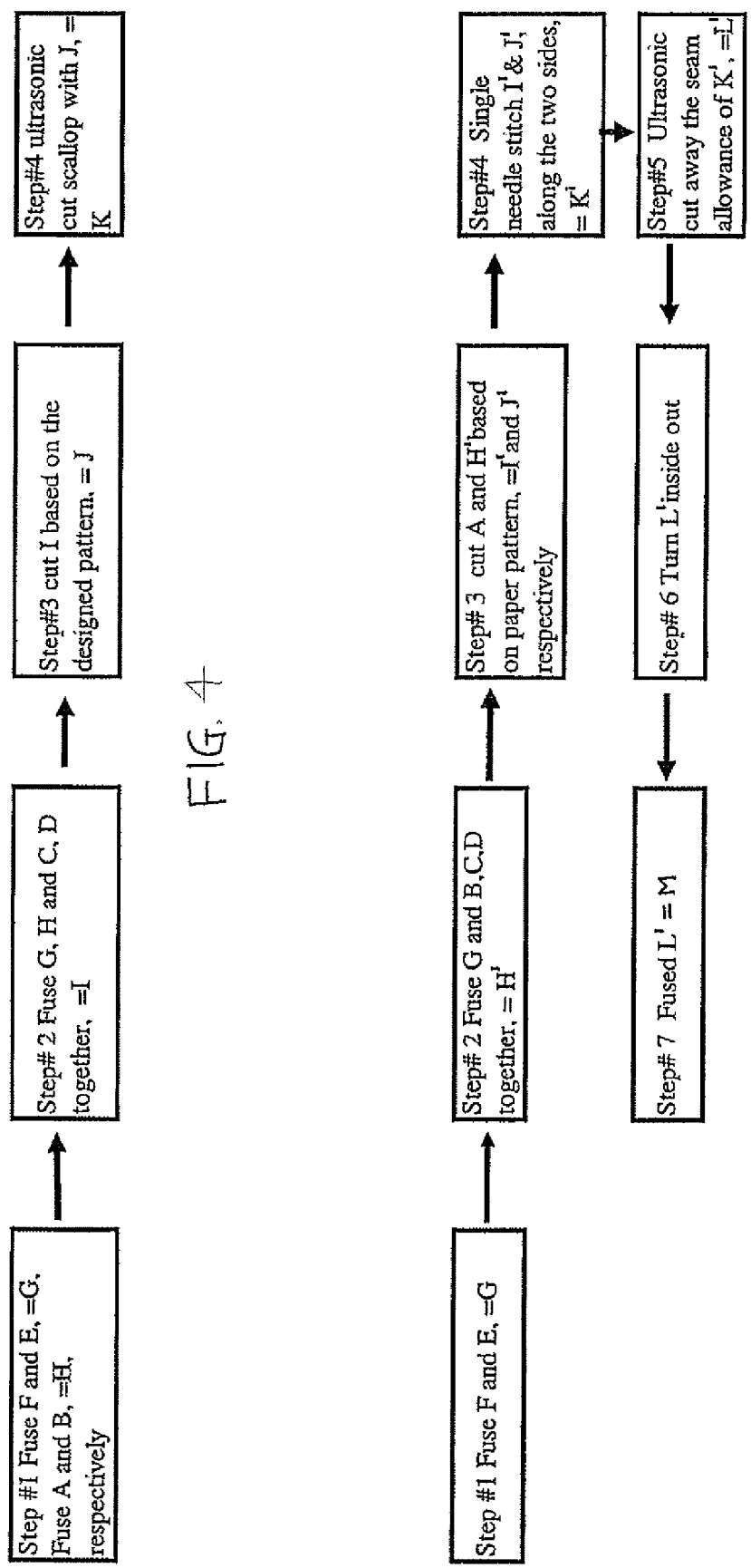
FIG. 4 is a flow chart depicting the steps of making the shoulder strap of FIG. 1.
FIG. 5 is a flow chart depicting the steps of making the shoulder strap of FIG. 2.

A flow chart showing the steps of manufacturing the shoulder strap 10 is depicted in FIG. 4. The first step includes attaching adhesive film B to stretch fabric A and attaching adhesive film E to stretch fabric F. The two adhesive films B and E may be applied directly onto the two stretch fabrics A and F, respectively, or the two adhesive films B and E may be transferred to the two stretch fabrics A and F, respectively, by appropriate transfer or carrier means known to one skilled in the art.

Figure 3B:
FIG. 3B depicts an application of carrier sheets for the manufacture of the shoulder straps of FIGS. 1 and 2.

As depicted in FIG. 3B, the adhesive film B may be provided on a backing paper or carrier sheet B', which is relatively rigid, and fused onto the stretch fabric A by a fusing machine, for example. The fusing machine may be any conventional fusing machine, such as a fusing machine manufactured by Macpi® under model number 553-37912-C0, or a fusing machine manufactured by Xinhua® under model number NHG-A0. The carrier sheet B' may be made of non-fusible silicone-coated paper or any other suitable material known to one skilled in the art.

The adhesive film B may be releasably provided on one side of the carrier sheet B'. The stretch fabric A may then be superimposed over the adhesive film B. The superimposed stretch fabric A and the adhesive film B with the carrier sheet B' may then be fed into the fusing machine. The fusing machine generates heat and pressure that may be sufficient to fuse the adhesive film B onto the stretch fabric A. After the fusing process, the carrier sheet B' may be peeled off from the adhesive film B to form an adhesive stretch fabric H.

Figure 3C:
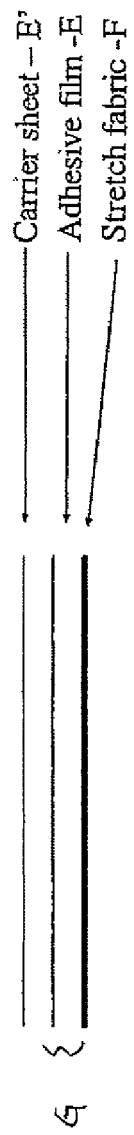
FIG. 3C depicts another application of carrier sheets for the manufacture of the shoulder straps of FIGS. 1 and 2.

Similarly, the adhesive film E may be fused onto the stretch fabric F. The adhesive film E may be provided on a relatively rigid carrier sheet E', as depicted in FIG. 3C. The carrier sheet E' may be made of non-fusible silicone-coated paper or any other suitable material known to one skilled in the art. The adhesive film E may be releasably provided on one side of the carrier sheet E'. The stretch fabric F may then be superimposed over the adhesive film E. The superimposed stretch fabric F and the adhesive film E with the carrier sheet E' may then be fed into the fusing machine. The fusing machine generates heat and pressure that may be sufficient to fuse the adhesive film E onto the stretch fabric F. After the fusing process, the carrier sheet E' may be peeled off from the adhesive film E to form an adhesive stretch fabric G.

The second step includes sandwiching the two rigid fabrics C and D between the two adhesive stretch fabrics G and H, with the adhesive films B and E facing inwardly towards each other, as depicted in FIG. 3A. The two rigid fabrics C and D may be located between the two adhesive stretch fabrics G and H at an intermediate position between the opposite ends of the two adhesive stretch fabrics G and H. The location of the two rigid fabrics C and D relative to the two adhesive stretch fabrics G and H may depend on the design of the article of clothing to be manufactured.

The sandwiched rigid fabrics C and D and adhesive stretch fabrics G and H may be fed into the fusing machine. The fusing machine generates heat and pressure that may be sufficient to fuse the adhesive film B onto rigid fabric C and to fuse adhesive film E onto rigid fabric D, thereby forming a semi-finished strap I.

Figure 6:
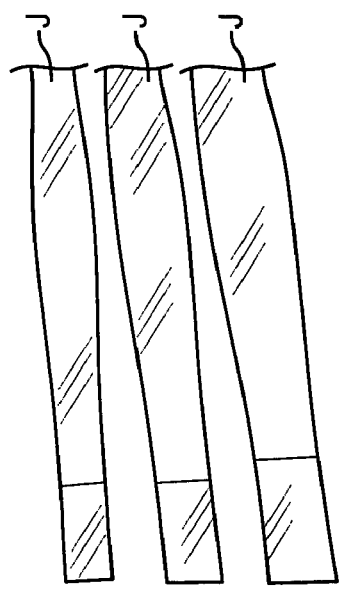
FIG. 6 depicts three different cuttings of shoulder straps made according to step 3 of the manufacturing process shown in FIG. 4.

The third step includes cutting the semi-finished strap I with a conventional cutting machine along the two longitudinal edges so as to form straps J of different shapes and sizes, as depicted in FIG. 6. For example, the semi-finished strap I may be cut out to form strap J having the relatively widened intermediate portion 12 and the two relatively narrowed end portions 14 and 16.

Figure 7:
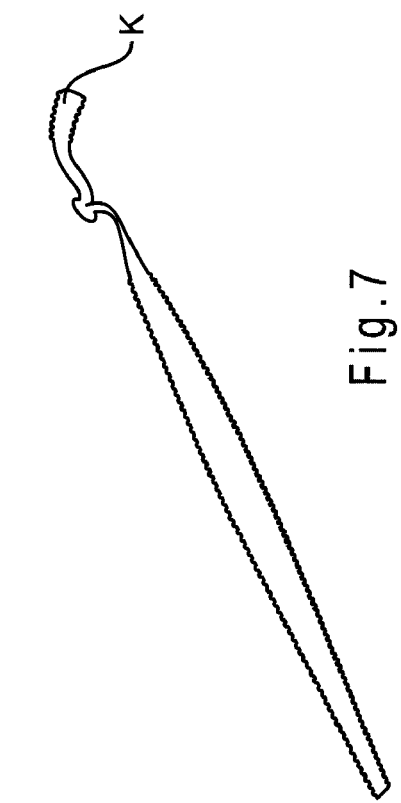
FIG. 7 depicts a scallop-cut shoulder strap made according to step 4 of the manufacturing process shown in FIG. 4.

The fourth step includes forming scallop cuts along the two longitudinal edges of the strap J using an ultrasonic cutting and fusing machine. For example, the ultrasonic cutting and fusing machine may be an ultrasonic cutting and fusing machine manufactured by Golden Casting Company under model number GC-BS. For example, the ultrasonic cutting and fusing machine may have a "scallop" blade rotatably mounted on the ultrasonic cutting and fusing machine. When the strap J is pushed through the rotating "scallop" blade, a seam may be cut, and a wavy scallop-shaped cutting may be formed along the edge of the strap J. An example of a finished product of the scallop cut shoulder strap K is depicted in FIG. 7.

A flow chart showing the steps of manufacturing the shoulder strap 20 is depicted in FIG. 5. For illustration purposes, the layer structure of the shoulder strap 20 is the same as the layer structure of the shoulder strap 10 as shown in FIG. 3A.

The first step includes fusing the adhesive film E onto the stretch fabric F using the fusing machine, as depicted in FIG. 3C. The fusing machine may be any conventional fusing machine, such as a fusing machine manufactured by Macpi® under model number 553-37912-C0, or a fusing machine manufactured by Xinhua® under model number NHG-A0.

The adhesive film E may be releasably provided on one side of the carrier sheet E'. The stretch fabric F may then be superimposed over the adhesive film E. The superimposed stretch fabric F and the adhesive film E with the carrier sheet E' may be fed into the fusing machine. The fusing machine generates heat and pressure that may be sufficient to fuse the adhesive film E onto the stretch fabric F. After the fusing process, the carrier sheet E' may be peeled off from the adhesive film E to form an adhesive stretch fabric G.

Figure 10:
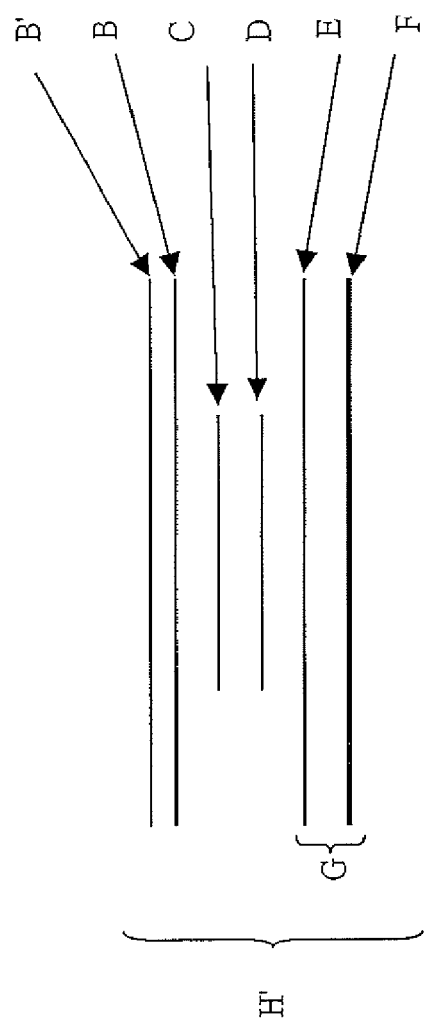
FIG. 10 depicts a fabric assembly made according to step 2 of the manufacturing process shown in FIG. 5.

The second step includes sandwiching the two rigid fabrics C and D between the adhesive stretch fabric G and the adhesive film B, which may be releasably provided on one side of the carrier sheet B', as depicted in FIGS. 3A and 3B. The sandwiched rigid fabrics C and D, adhesive stretch fabric G, and adhesive film B with carrier sheet B' forming the outermost layer may be fed into the fusing machine. The fusing machine generates heat and pressure that may be sufficient to fuse the adhesive films B and E and adhere the two rigid fabrics C and D, and the stretch fabric F together to form a fabric assembly H', as depicted in FIG. 10.

Figure 8:
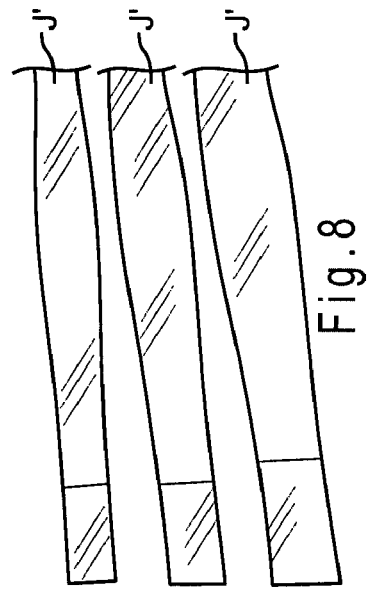
FIG. 8 depicts three different cuttings of shoulder straps made according to step 3 of the manufacturing process shown in FIG. 5.

The third step includes cutting the fabric assembly H' using a conventional cutting machine along the two longitudinal edges so as to form straps J' of different shapes and sizes, as depicted in FIG. 8. For example, the fabric assembly H' may be cut out to form the widened intermediate portion 22 and the two narrowed end portions 24 and 26. The stretch fabric A may be cut to the shape and size of the strap J' to form stretch fabric I'. After the cutting process, the stretch fabric I' and the strap J' may be put side by side in a superimposed position.

Figure 9:
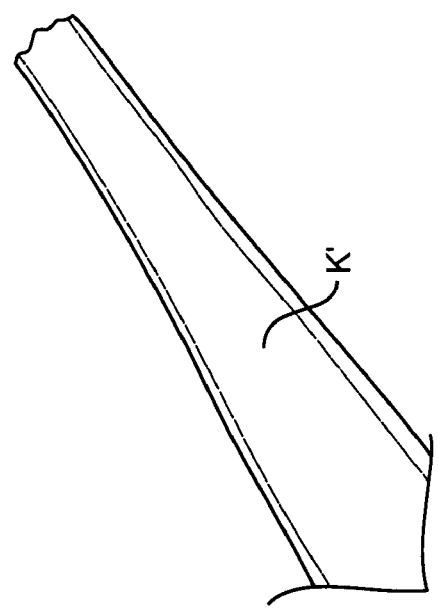
FIG. 9 depicts a stitched strap made according to step 4 of the manufacturing process shown in FIG. 5.

The fourth step includes stitching along each longitudinal side of the superimposed stretch fabric I' and strap J' to form a stitched strap K' with a seam allowance along each longitudinal side, as depicted in FIG. 9. Stitching may be formed using any conventional sewing machine.

Figure 11:
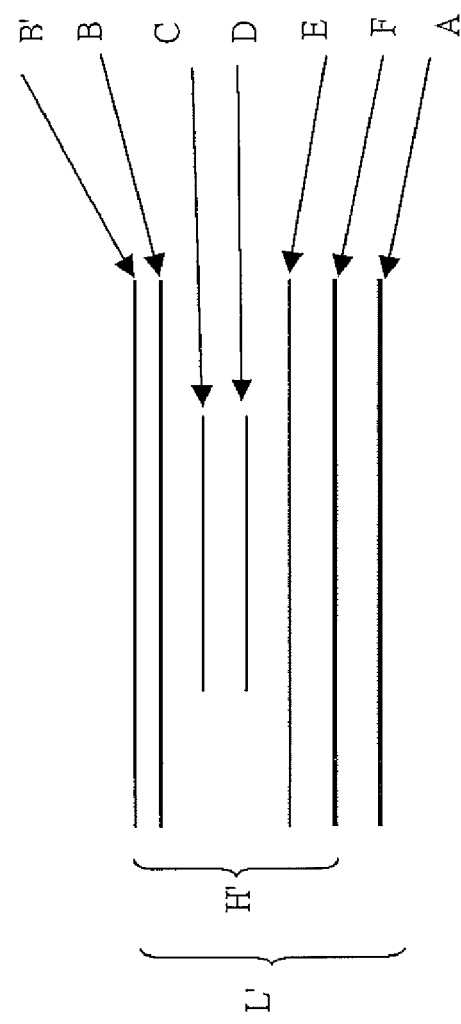
FIG. 11 depicts a cut and fused strap made according to step 5 of the manufacturing process shown in FIG. 5.

The fifth step includes simultaneously cutting away the seam allowance of stitched strap K' along each longitudinal side and fusing each longitudinal edge using an ultrasonic cutting and fusing machine to form a cut and fused strap L', as depicted in FIG. 11. The cut and fused strap L' may be formed by exposing a sleeve with the adhesive film B after the carrier sheet B' is peeled off.

The sixth step includes turning the strap L' inside out using a jig. The jig may include a vertically extending upper rod and a vertically extending lower rod. The vertically extending upper and lower rods may be supported by a frame and may be arranged in collinear alignment with each other.

The upper and lower rods and may be in vertically spaced apart relationship, although the two collinear rods may be disposed horizontally or in any other orientation. To turn the strap L' inside out, L' may be first pushed up from the lower free end of the upper rod so that L' may be entirely wrapped around the upper rod except for the lowermost portion.

The lower rod may be moved vertically upwards towards the upper rod until the upper free end of the lower rod comes into contact with the lower free end of the upper rod. This may fixedly hold the lowermost portion of the strap L' in between the upper free end and the lower free end. The strap L' may then be turned inside out by pulling it downwards over itself until it is entirely turned inside out and wrapped around the lower rod.

The lower rod may then be moved downwards so that the upper free end of the lower rod is out of contact with the lower free end of the upper rod. This allows the release of the strap L' by pulling it straight out from the lower rod. After the strap L' is turned inside out, the adhesive film B may be disposed inside the strap L' between the two stretch fabrics A and F.

The seventh step includes feeding to the strap L' into the fusing machine and fusing the adhesive film B onto the stretch fabric A to form the finished shoulder strap.

While the examples of the methods and products have been described, it should be understood that the methods and products are not so limited, and modifications may be made. The scope of the method and products is defined by the appended claims, and all methods and products that come within the meaning of the claims, either literally or by equivalence, are intended to be embraced therein.

The invention claimed is:

1. A shoulder strap, comprising:
    a first stretchable fabric and a second stretchable fabric; and
    a first non-stretchable fabric sandwiched between said first stretchable fabric and said second stretchable fabric thereby forming the shoulder strap, the first non-stretchable fabric being adhered to said first stretchable fabric and said second stretchable fabric, wherein said first non-stretchable fabric is located at an intermediate position between opposite longitudinal ends of said first stretchable fabric and said second stretchable fabric;
    wherein the first and second stretchable fabrics are substantially more stretchable than the first non-stretchable fabric, and
    further comprising a second non-stretchable fabric sandwiched between said first stretchable fabric and said second stretchable fabric and adhered to said second stretchable fabric.

2. An article of clothing, comprising a body and the shoulder strap of claim 1 attached to the body, the article of clothing selecting from the group consisting of a brassiere and a handbag.

3. The shoulder strap of claim 1, further comprising a relatively widened intermediate portion.

4. The shoulder strap of claim 3, wherein said intermediate portion defines a shoulder-engaging portion for engagement with the shoulder of an user.

5. The shoulder strap of claim 3, further comprising a relatively narrowed end portion adjacent said relatively widened intermediate portion.

6. The shoulder strap of claim 5, wherein said end portion defines a supporting portion for supporting an article of clothing being worn by an user.

7. The shoulder strap of claim 1, further comprising scallop cuts along longitudinal edges of said shoulder strap.

8. The shoulder strap of claim 1, wherein a length of said first stretchable fabric is substantially the same as a length of said second stretchable fabric.

9. The shoulder strap of claim 1, wherein a length of said first non-stretchable fabric is substantially the same as a length of said second non-stretchable fabric.

10. The shoulder strap of claim 1, wherein lengths of said first and second non-stretchable fabrics are shorter than lengths of said first stretchable fabric and said second stretchable fabric.

11. The shoulder strap of claim 1, wherein said first and second non-stretchable fabrics are made of nylon.

12. The shoulder strap of claim 1, wherein said first and second stretchable fabrics are made of nylon spandex.

* * * * *